(12) United States Patent
Stierle et al.

(10) Patent No.: US 6,912,888 B2
(45) Date of Patent: Jul. 5, 2005

(54) MANUAL APPLIANCE FOR CONTACTLESS DISTANCE MEASUREMENT

(75) Inventors: Joerg Stierle, Waldenbuch (DE); Peter Wolf, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/399,918

(22) PCT Filed: Jun. 8, 2002

(86) PCT No.: PCT/DE02/02093

§ 371 (c)(1),
(2), (4) Date: Apr. 16, 2003

(87) PCT Pub. No.: WO03/027610

PCT Pub. Date: Apr. 3, 2003

(65) Prior Publication Data

US 2004/0025563 A1 Feb. 12, 2004

(30) Foreign Application Priority Data

Aug. 29, 2001 (DE) .......................... 101 42 166

(51) Int. Cl.⁷ ............................. G01B 21/00; G01B 3/30
(52) U.S. Cl. ....................................... 73/1.79
(58) Field of Search .................... 33/713, 770; 73/1.79; 356/3.03, 4.01, 5.01, 9

(56) References Cited

U.S. PATENT DOCUMENTS

| | | | | |
|---|---|---|---|---|
| 4,566,198 A | * | 1/1986 | Vitale ......................... 33/759 |
| 4,730,190 A | * | 3/1988 | Win et al. .................... 342/118 |
| 5,182,863 A | * | 2/1993 | Rando .......................... 33/227 |
| 5,949,529 A | * | 9/1999 | Dunne et al. ............... 356/4.01 |
| 6,137,564 A | * | 10/2000 | Schmidt et al. ............ 356/4.01 |
| 6,336,277 B1 | * | 1/2002 | Sprenger ...................... 33/758 |

FOREIGN PATENT DOCUMENTS

| | | |
|---|---|---|
| DE | 196 52 438 A | 6/1998 |
| DE | 198 04 051 A | 8/1999 |

* cited by examiner

Primary Examiner—Charles Garber
(74) Attorney, Agent, or Firm—Michael J. Striker

(57) ABSTRACT

The invention has disclosed a handheld device for contactless distance measurement, having a housing (11) with a housing front (15) pointing in the measuring direction (17) and a housing back (16) oriented away from it, having a linear first measuring stop (21) that is embodied on the housing back (16) oriented away from the measuring direction (17) and that lies in a reference plane for the distance measurement, and having means disposed on the housing back (16) for producing a flat second measuring stop (22) that is aligned at right angles to the measuring direction and points away from the measuring direction (17). In order to achieve a structurally simple embodiment of the second measuring stop (22) that also makes it possible to provide the housing (11) with a third flat measuring stop, which points in the measuring direction and is intended for another measuring task, the means for producing the second measuring stop (22) have a pivoting wedge (24) supported on the housing (11) in pivoting fashion, whose one wedge surface (241) supports the second measuring stop (22).

12 Claims, 2 Drawing Sheets

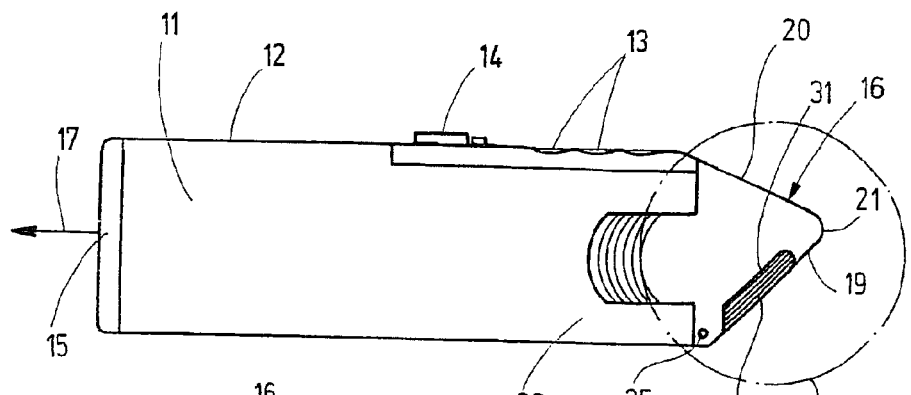
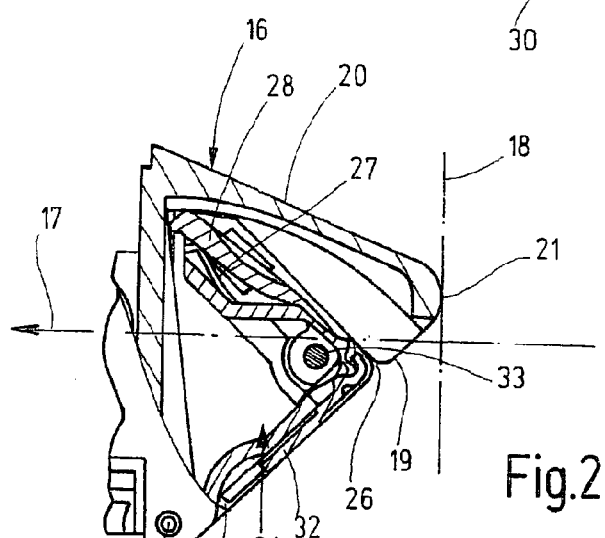
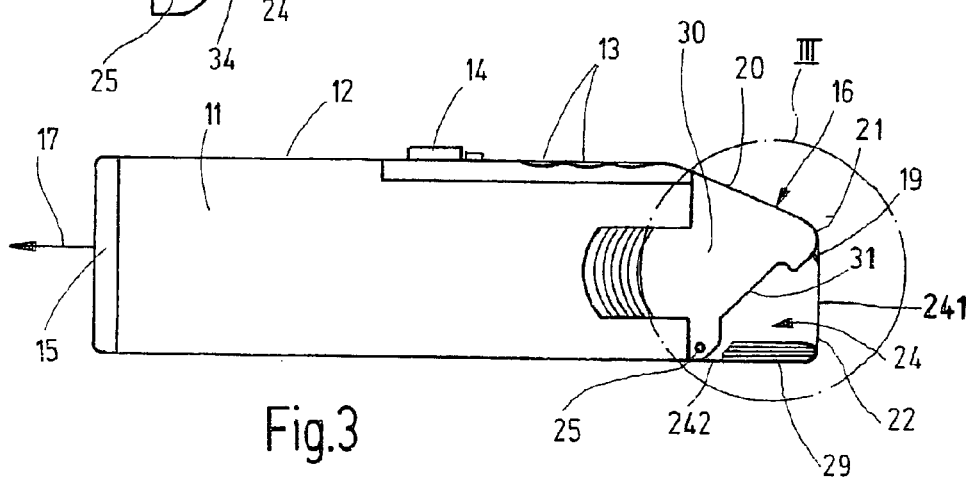

MANUAL APPLIANCE FOR CONTACTLESS DISTANCE MEASUREMENT

BACKGROUND OF THE INVENTION

The invention is based on a handheld for contactless distance measurement.

Handheld devices of this kind measure the distance of a pertinent object from a reference point, against which a corresponding measuring stop of the handheld device is placed. Such a handheld device can be designed as a laser measuring device, an ultrasound measuring device, or a high-frequency measuring device. In any case, the distance is determined by measuring the travel time of a pulse emitted by the handheld device, reflected against the pertinent object, and received again by the handheld device.

In a known handheld distance measuring device (DE 196 52 438 C2), a linear measuring stop is constituted by the longitudinal edge of the back side of the housing, which tapers to a point, wherein the transition region from the housing top and the housing bottom to the longitudinal edge is rectilinear or curved in an arc shape. The middle part of this longitudinal edge, including the associated transition region to the housing top and housing bottom, is embodied so that it can turn around a rotation axis parallel to the measuring direction so that it can be turned by an arbitrary rotation angle in relation to the two outer, stationary parts of the longitudinal edge. If the middle and the two outer parts of the longitudinal edge are flush with one another, then this longitudinal edge of the back of the distance measuring device can be brought to rest, for example, against a corner line formed by two walls, thus allowing the diagonals of a room to be measured. Since the longitudinal edge lies in the reference plane for the distance measurement, then the value indicated on the display of the distance measuring device is the actual distance from the corner line to the pertinent object, for example the diagonally opposite corner of the room. On the other hand, if the distance measuring device is used for measurements starting from surfaces oriented toward the object, e.g. walls, ceilings, floors, then the middle region of the longitudinal edge, including the associated transition region, must be turned by an arbitrary rotation angle, e.g. by approx. 90°. Since the rotation axis is aligned parallel to the measuring direction, the parts of the longitudinal edge that are rotated in relation to one another by the rotation angle always lie in a plane perpendicular to the measuring direction. Consequently, the measuring direction is steadily aligned at right angles to a planar guide surface and the distance is measured from the stop surface to the pertinent object. The result displayed by the distance measuring device corresponds exactly to the distance from the selected stop surface to the pertinent object, without requiring a conversion or an adjustment in the distance measuring device.

In a likewise known distance measuring device (DE 198 04 051 A1), the linear measuring stop for placement against a reference line, e.g. the corner line between two walls, is eliminated and a flat measuring stop is embodied on the planar back wall of the housing. In the event that a measurement is to be made starting from an outside edge, i.e. the guide edge for the distance measuring device is oriented away from the object to be measured, an additional stop is provided, which is embodied on the inside of a pivoting flap pivotably connected to the housing. When the additional measuring stop is not in use, the pivoting flap is folded against the bottom of the housing and, in order to activate the additional measuring stop, can be pivoted out from the housing by 90°. In this pivoted position of the pivoting flap, the additional measuring stop is oriented toward the object to be measured and lies in the reference plane for the distance measurement so that after the additional measuring stop is placed against the outer edge and the measuring operation is triggered, the distance value indicated on the display is the actual distance of the pertinent object from the guide edge.

SUMMARY OF THE INVENTION

The handheld device for contactless distance measurement according to the invention has the advantage that in addition to the two types of distance measurement achieved either by placing the linear first measuring stop against a corner line oriented toward the object to be measured or by placing the flat second measuring stop against a surface oriented toward the object to be measured, the pivoting wedge according to the invention makes it easily possible to also produce a third measuring stop that permits the distance measuring device to be placed against a surface oriented away from the object. According to a preferred embodiment of the invention, this third measuring stop is produced by providing the pivoting wedge with a pivotable pivoting flap, which supports the flat third measuring stop and is embodied so that in a fixed pivoted position of the pivoting part and the pivoting flap, the third measuring stop points in the measuring direction and lies in the reference plane for the distance measurement. Since this means that all three measuring stops—after their respective activation—lie in the reference plane for the distance measurement, the distance value indicated on the display of the handheld device always corresponds to the actual distance between the guide edge or guide surface and the pertinent object, independent of which of the three measuring stops has been used. This makes it unnecessary for the value to be converted or for the measuring device to be adjusted to a different reference plane.

According to an advantageous embodiment of the invention, the pivoting wedge has a starting position, which is established so that the second measuring stop lies in the reference plane, and a pivoted-in position in which it is pivoted completely into the housing. In the starting position, the pivoting wedge is locked on the housing in a releasable fashion. This establishment of the starting position of the pivoting wedge permanently sets the handheld device for its main use, namely the measurement of distance from a guide surface oriented toward the object to be measured. For the other measuring tasks, the respectively required measuring stop need only be activated by means of a single grip, namely by pivoting the pivoting flap out from the pivoting wedge, which is situated in its starting position, in order to activate the third measuring stop and by pivoting the pivoting wedge, which is situated in its starting position, into the housing in order to activate the first measuring stop.

BRIEF DESCRIPTION OF THE DRAWINGS

The invention will be explained in detail in the description that follows in conjunction with an exemplary embodiment shown in the drawings.

FIG. 1 shows a side view of a handheld device for contactless distance measurement, with an activated, linear first measuring stop, FIG. 2 shows a sectional depiction of the enlarged detail 11 from FIG. 1, FIG. 3 shows a side view of the handheld device, which is situated in its starting position, with an activated second measuring stop.

DESCRIPTION OF THE EMBODIMENTS

Figure 4:
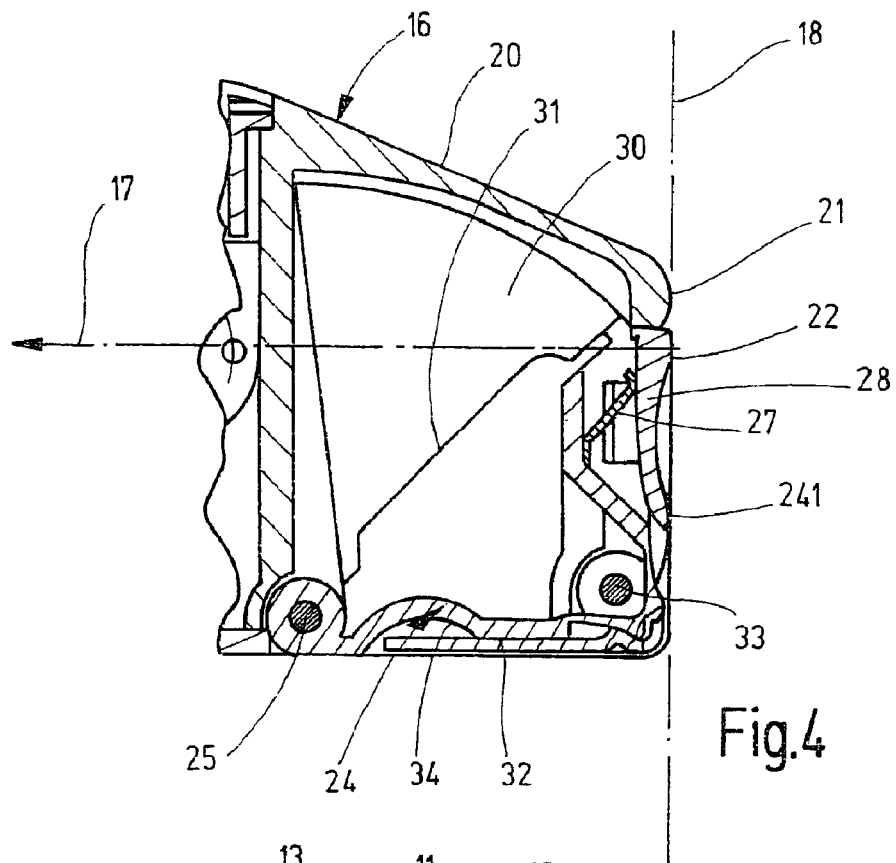
FIG. 4 shows a sectional depiction of the enlarged detail IV in FIG. 3.

The handheld device for contactless distance measurement, also referred to as a handheld distance measuring device, which is shown in a side view in FIGS. 1 and 3 respectively set for two different measuring tasks, has an approximately block-shaped housing 11, the top 12 of which is provided with various function buttons 13 for switching it on and off, and for calling up various measuring programs, as well as a button 14 for triggering a measuring operation. In addition, the top 12 is provided with a display field, not shown here, which indicates the measurement value determined as well as other information. The front 15, which points in the measuring direction, is provided with a window to permit emission of a radio range beam and the exit and entry of measuring pulses, while the back 16 of the housing 11 oriented away from the measuring direction 17 serves as a guide for the housing 11 when executing a measuring operation. The front 15 is embodied with a distinct curvature so that the user does not inadvertently use the front 15 as a guide for the handheld device.

Figure 5:
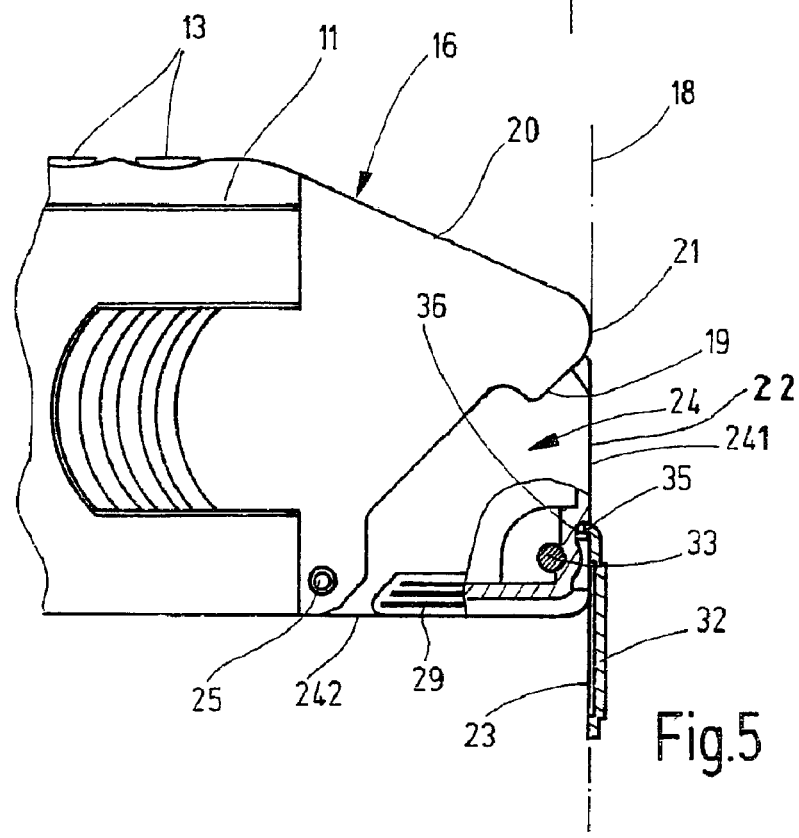
FIG. 5 shows an enlarged depiction of the detail IV from FIG. 3, with an activated third measuring stop.

The design and function of the handheld device, embodied for example as a laser measuring device, is described in DE 198 04 051 A1 and is only relevant in the context of the invention described here insofar as the distance to a pertinent object, which distance is indicated by the handheld device after a measuring operation is triggered, is measured starting from a reference plane 18 established on the housing 11 (FIGS. 2, 4, and 5). Therefore, if one wishes to read the correct measurement value for the distance from a desired point to a pertinent object in the indicator field or on the display of the handheld device, then the handheld device must be placed with its back 16 against this desired point so that the latter lies in the reference plane 18. To this end, the housing back 16 is provided with three different measuring stops, which can be respectively activated to execute three different measuring operations. These three measuring tasks are:

1. Distance measurement between two opposing objects with a linear reference site, e.g. a corner line between two abutting room walls, to guide the handheld device, 2. Distance measurement between two opposing objects with a guide surface oriented toward the object, e.g. the distance between two opposite walls of a room, 3. Distance measurement between two opposing objects with a guide surface for the handheld device oriented away from the object, e.g. a table edge.

Measuring task no. 2 here is the main use of the handheld distance measuring device.

In order to produce a first measuring stop 21, which is oriented away from the measuring direction 17, is embodied in linear form, and is used to execute measuring task no. 1, the housing back 16 has a prism-like, triangular contour with two prism surfaces 19, 20 that abut each other at an acute angle, the abutting edge constituting the linear first measuring stop 21. The abutting edge is slightly rounded, the reference plane 18 for the distance measurement constituting a tangent to the curvature, extending at right angles to the measuring direction 17 (FIGS. 1 and 2).

In order to execute measuring task no. 2 (FIGS. 3 and 4), a flat, second measuring stop 22 is provided, which is oriented away from the measuring direction 17 and also lies in the reference plane 18. This second measuring stop 22 is produced with the aid of a pivoting wedge 24, which can be pivoted around a pivot axis 25 extending parallel to the first measuring stop 21. The pivot axis 25 can, as shown in FIGS. 1 to 3, be situated in the lower region of the housing back 16 or can also be embodied, for example, in the region of the first measuring stop 21 so that the second measuring stop would have a free lower end. The lower prism surface 19 of the housing back 16, which prism surface extends toward the housing bottom, is provided with an opening 26, which allows the pivoting wedge 24 to pivot completely into the housing 11, as depicted in the sectional representation in FIG. 2, and can be pivoted completely out from the housing 11, as shown in FIGS. 3 to 5. The pivoting wedge 24 has two wedge surfaces 241 and 242 aligned at right angles, of which the one wedge surface 241 supports the second measuring stop 22 or—as in the exemplary embodiment shown—itself constitutes the flat, second measuring stop 22. The pivoting wedge 24 is embodied so that it assumes a starting position shown in FIGS. 3 to 5, in which it is pivoted out from the housing 11 and the second measuring stop 22 lies in the reference plane 18 for the distance measurement. A locking button 28 prestressed by means of a spring 27 locks the pivoting wedge 24 in this starting position. In this starting position of the pivoting wedge 24, it is possible to execute measuring task no. 2, for which purpose the flat, second measuring stop 22 is placed against a stop surface, e.g. a wall, that is oriented toward the object to be measured.

If measuring task no. 1 is to be executed starting from this starting position of the pivoting wedge 24, then the locking button 28 is pressed and the pivoting wedge 24 is pivoted completely into the housing 11, as shown in FIGS. 1 and 2. The second wedge surface 242 of the pivoting wedge 24 is embodied so that in this pivoted-in position of the pivoting wedge 24, this second wedge surface 242 closes the opening 26 in the lower prism surface 19 and is thus flush with the prism surface 19. In this pivoted-in position of the pivoting wedge 24, only the approximately linear first measuring stop 21 is free to execute measuring task no. 1.

In order to execute measuring task no. 2, the pivoting wedge 24 is pivoted back out from the housing 11 into its starting position shown in FIGS. 3 to 5. To this end, the pivoting wedge 24 is provided with grasping surfaces 29 on both sides of the wedge surface 242 to permit the user to grasp the pivoting wedge 24. In order to allow access to the grasping surfaces 29 in the pivoted-in position of the pivoting wedge 24, recesses 31 are provided in the side walls 30 of the housing 11, in the vicinity of the opening 26 in the prism surface 19, which opening extends to the side walls 30 of the housing 11, and a grasping surface 29 is respectively disposed in each of these recesses 31 when the pivoting wedge 24 is in its pivoted-in position inside the housing 11.

In order to execute measuring task no. 3 (FIG. 5), a third flat measuring stop 23 is provided, which when activated, points in the measuring direction 17, and lies in the reference plane 18 for the distance measurement. This third measuring stop 23 is disposed on a pivoting flap 32, which can be pivoted on the pivoting wedge 24 around a pivot axis 33 parallel to the pivot axis 25 of the pivoting wedge 24. The pivot axis 33 extends close to the wedge tip of the pivoting wedge 24. The pivoting flap 32 is normally disposed in a cavity 34 in such a way that its back is flush with the wedge surface 242. On its inside oriented away from the back, the pivoting flap 32 supports the flat, third measuring stop 23 that in this instance is also constituted by the inner surface of the pivoting flap 32 itself. In order to execute measuring task no. 3, the pivoting flap 32 is pivoted by 90° out from the cavity 34, for which purpose the cavity 34 is embodied in the frontal region so that the free end of the pivoting flap 32 can be manually grasped. In the 90° pivoted position, a catch 35 of the pivoting flap 32 strikes against a stop 36 embodied on the pivoting wedge 24. The stop 36 and the catch 35 are situated so that when pivoted out by 90°, the pivoting flap 32 assumes a position in which the third stop 23 lies in the reference plane 18 for the distance measurement. One or more spring elements can hold the stop 32 in the respective end position. When executing measuring task no. 3, the third measuring stop 23 is placed against a stop edge or stop surface oriented away from an object, and the distance between this stop edge or stop surface and the pertinent object is measured by actuating the trigger button 14. Since the third measuring stop once again lies in the reference plane 18 for the distance measurement, the measurement value indicated on the display of the handheld device represents the actual distance.

What is claimed is:

1. A handheld device for contactless distance measurement, having a housing (11) with a housing front (15) pointing in the measuring direction (17) and a housing back (16) oriented away from the measuring direction (17), having a linear first measuring stop (21) that is embodied on the housing back (16) oriented away from the measuring direction (17) and that lies in a reference plane (18) for the distance measurement, and having means disposed on the housing back (16) for producing a flat second measuring stop (22) that is aligned at right angles to the measuring direction (17) and points away from the measuring direction and that lies in the reference plane (18) for the distance measurement, characterized in that the means for producing the second measuring stop (22) have a pivoting wedge (24) supported on the housing (11) in pivoting fashion, whose one wedge surface (241) forms the second measuring stop (22) as a whole.

2. The handheld device according to claim 1, characterized in that the wedge surface (241) of the pivoting wedge (24) with the second measuring stop (22) itself constitutes the second measuring stop (22).

3. A handheld device for contactless distance measurement, having a housing (11) with a housing front (15) pointing in the measuring direction (17) and a housing back (16) oriented away from the measuring direction (17), having a linear first measuring stop (21) that is embodied on the housing back (16) oriented away from the measuring direction (17) and that lies in a reference plane (18) for the distance measurement, and having means disposed on the housing back (16) for producing a fist second measuring stop (22) that is aligned at right angles to the measuring direction (17) and points away from the measuring direction and that lies in the reference plane (18) for the distance measurement, the means for producing the second measuring stop (22) have a pivoting wedge (24) supported on the housing (11) in pivoting fashion, whose one wedge surface (241) supports the second measuring stop (22), characterized in that the housing back (16) has a triangular contour with two prism surfaces (19, 20) that abut each other at an acute angle, that the preferably rounded abutting edge of the prism surfaces (19, 20) constitutes the first measuring stop (21), and that the pivot axis (25) of the pivoting wedge (24) extends parallel to the first measuring edge (21).

4. The hand held device according to claim 3, characterized in that the one prism surface (19) of the housing back (16) is provided with an opening (26), which allows the pivoting wedge (24) to pivot in and out.

5. The handheld device according to claim 4, characterized in that the pivoting wedge (24) has a starting position, which is established so that the second measuring stop (22) lies in the reference plane (18), and has a pivoted-in position in which it is pivoted completely into the housing (11).

6. The handheld device according to claim 5, characterized in that the pivoting wedge (24) is locked on the housing (11) in a releasable fashion, at least in its starting position.

7. The handheld device according to claim 5, characterized in that the pivoting wedge (24) is designed so that in its pivoted-in position, the wedge surface (242) without the second measuring stop (22) covers the opening (26) in the prism surface (19) of the housing back (10), the wedge surface (242) preferably being flush with this prism surface.

8. The handheld device according to claim 5, characterized in that the pivoting wedge (24) is provided with a pivoting flap (32), which is provided with a flat third measuring stop (23) and is designed so that in the starting position of the pivoting wedge (24), this pivoting flap (32) can be moved into a fixed pivoted position in which the third measuring stop (23) points in the measuring direction (17) and lies in the reference plane (18) for the distance measurement.

9. The handheld device according to claim 8, characterized in that the pivoting flap (32) is designed so that it can be fold ad against the wedge surface (242) of the pivoting wedge (24) without the second measuring stop (22) and reaches its fixed pivoted position after being pivoted out by a definite pivoting angle from the pivoting wedge (24), which is disposed in its starting position.

10. The handheld device according to claim 8, characterized in that the pivoted position of the pivoting flap (32) is fixed by means of a stop (36), which is embodied on the pivoting wedge (24) and against which a catch (35) embodied on the pivoting flap (32) comes to rest.

11. The handheld device according to claim 8, characterized in that the wedge surface (242) of the pivoting wedge (24) without the second measuring stop (22) has a cavity (34) formed into it, in which the pivoting flap (32), when folded against the wedge surface (242), rests in such a way that its back oriented away from the third measuring stop (23) is approximately flush with the wedge surface (242).

12. A handheld device for contactless distance measurement, having a housing (11) with a housing front (15) pointing in the measuring direction (17) and a housing back (16) oriented away from the measuring direction (17), having a linear first measuring stop (21) that is embodied on the housing back (16) oriented away from the measuring direction (17) and that lies in a reference plane (18) for the distance measurement, and having means disposed on the housing back (16) for producing a flat second measuring stop (22) that is aligned at right angles to the measuring direction (17) and points away from the measuring direction and that lies in the reference plane (18) for the distance measurement, characterized in that the means for producing the second measuring stop (22) have a pivoting wedge (24) supported on the housing (11) by an axis (25) perpendicular to the measuring direction (17), and whose one wedge surface (241) forms a second measuring step (22).

* * * * *